Patented Dec. 14, 1948

2,456,216

UNITED STATES PATENT OFFICE 2,456,216

CHLORINE-CONTAINING VINYL RESINS STABILIZED WITH A TRI-(2-ALKENYL)-PHOSPHITE AND A 1,2-EPOXY COMPOUND

Henry J. Richter, Glen Ellyn, Ill., assignor to E. I. du Pont de Nemours & Company, Wilmington, Del., a corporation of Delaware No Drawing. Application February 4, 1948, Serial No. 6,342

11 Claims. (Cl. 260—78.5)

This invention relates to chlorine-containing vinyl resin compositions and to methods for preventing or retarding their discoloration by heat or light. More specifically this invention relates to chlorine-containing vinyl polymers and copolymers showing improved resistance to discoloration on exposure to the action of heat or light and to methods for their preparation.

In many applications of chlorine-containing vinyl polymers, as for example vinyl chloride polymers and copolymers, it is necessary to subject the vinyl resin to elevated temperatures to permit formation into various products. These vinyl resins tend to decompose somewhat on heating which decomposition is generally recognized by the development of color. Even though slight decomposition on heating may not detract to any appreciable extent from the physical properties of the resin, the discoloration seriously restricts its use in many applications. The use of these resins is further restricted due to discoloration and embrittlement which takes place on exposure to light. Heretofore, a wide variety of materials have been disclosed to function as stabilizers for chlorine-containing vinyl resins by minimizing discoloration on exposure to heat or light. However, such stabilizers have not been entirely satisfactory, particularly in preventing discoloration of vinyl chloride resins under strong exposure to light and at elevated temperatures.

This application is a continuation of my application Serial No. 694,167, filed August 30, 1946, now abandoned.

It is an object of this invention to provide chlorine-containing vinyl resin compositions showing improved resistance to discoloration on exposure to the action of heat and light. A further object of this invention is to provide a method for preventing or substantially retarding the discoloration of vinyl chloride resin compositions on exposure to heat and light. A still further object is to provide polymers and copolymers of vinyl chloride stabilized against decomposition by heat or light. Other objects will appear hereinafter.

These objects are accomplished by the preparation of compositions of matter comprising a chlorine-containing vinyl resin of 14–75% by weight chlorine and having the chlorine attached directly to the carbon atoms in the polymer chain; from 1 to 6% by weight, based on the resin, of a tri-(2-alkenyl)-phosphite having 3–14 carbons in each alkenyl group; and from 0.1 to 5.0% by weight, based on the resin, of a 1,2-epoxy compound having a boiling point above 200° C. at atmospheric pressure. In some instances it is advantageous to add from 0.1 to 3.0% by weight, based on the resin, of an alkali or alkaline earth metal salt of a fatty acid of from 10 to 18 carbon atoms.

Examples of tri(2-alkenyl)phosphites include tri-(2-propenyl)phosphite (triallyl phosphite), tri(2-methyl-2-propenyl)phosphite (trimethallyl phosphite), and tri-(2-butenyl)phosphite (tricrotonyl phosphite). The tri-(2-alkenyl)phosphites containing 3 to 4 carbon atoms in each alkenyl group and having a terminal $CH_2{=}C$ group in each alkenyl group are preferred for use in this invention. The proportion of unsaturated phosphite may be varied widely, but from 1 to 6%, based on the weight of dry resin, is preferred.

This invention is generic to the use of 1,2-epoxy compounds. For most purposes the higher boiling 1,2-epoxides are preferred, namely those boiling above 200° C. and up to 400° C. at atmospheric pressure, since compositions containing these compounds retain their resistance to discoloration due to heat and light under more drastic conditions and for longer periods of time. Although in general, 0.1 to 5% of epoxy compound based on the weight of the dry resin, is sufficient to obtain the desired effect in the stabilizer combination of this invention, best results are obtained however with 1.0 to 5%.

The salts of fatty acids suitable for use in the practice of this invention are the alkali metal and alkaline earth metal salts of fatty acids containing 10 to 18 carbon atoms, including sodium decanoate and magnesium laurate. Magnesium stearate and sodium stearate are among the readily available fatty acid salts which are preferred for use in this invention. In general, 0.1 to 3% of fatty acid salts, based on the weight of the dry resin, is sufficient to produce the desired effect.

The stabilized chlorine-containing vinyl resin compositions of this invention are prepared by adding to the chlorine-containing vinyl polymer the tri(2-alkenyl)phosphite and at least one member of the class consisting of the above-described 1,2-epoxy compounds and alkali or alkaline earth metal salts of long chain fatty acids containing 10 to 18 carbon atoms. Any convenient method may be employed to incorporate the stabilizers with the chlorine-containing vinyl polymers. However, best results are obtained by mixing the polymers, for example, those resulting from the polymerization of vinyl chloride, or from the conjoint polymerization of vinyl chloride and another polymerizable monomer, with the stabilizer, for example 3% of a tri(2-alkenyl)phosphite and 2% of a 1,2-epoxy compound, with or without the aid of a volatile solvent, and milling the resulting mixture on rolls at 100° to 160° C. until completely homogenized. It is not desirable to continue milling any longer than required to homogenize the mixture since long milling will cause some discoloration of the resin. It is therefore advantageous to mix the resin and stabilizers thoroughly before milling. The stabilized resin is removed from the mill in the form of a sheet of the desired thickness and may be used as such or subjected to a polishing treatment. It is particularly desirable to remove the sheeting from the mill at a temperature of about 145° to 160° C. since at lower temperatures the sheeting obtained is somewhat brittle.

Polished films are readily prepared by heating the milled sheet, under pressure, between highly polished plates. Although the optimum temperature for polishing varies with the type of resin being used, in general it is preferred to employ a temperature of about 150° to 160° C. and a pressure of about 250 to 500 lbs./sq. in.

Stabilized sheeting, obtained by milling the resin and stabilizers, may also be chopped into the desired size for injection molding purposes. This milling procedure is readily adaptable to the preparation of stabilized vinyl chloride resin compositions containing plasticizer, pigment, dye and the like, which may then be used for lacquers, spinning of fibers, film casting, and fabric coatings.

Another method of incorporating the stabilizers of this invention is to make a thick slurry of the resin with some liquid which is a non-solvent for the polymer and an inert solvent for the stabilizer combination. Suitable solvents include diethyl ether, aliphatic hydrocarbons, preferably those having low boiling points, and the lower aliphatic alcohols where excessive heat can be avoided. The solvent is allowed to evaporate leaving the stabilizer composition uniformly distributed over the polymer. This drying operation is conveniently carried out in a rotary drier.

In certain instances, it may be desirable to prepare the stabilized chlorine-containing vinyl resin compositions of this invention by adding the stabilizer combination to the polymer dispersion as it is obtained from the polymerization vessel in accordance with the process described in the patent application of H. W. Arnold, Serial No. 427,921, now Patent No. 2,404,780 filed January 23, 1941. If this procedure is followed, it is desirable to bring the pH of the dispersion to about 7 to avoid decomposition of the 1,2-epoxy compound. In this process care should be used in selecting the unsaturated phosphite since the lower members of the series are somewhat hydrolyzed by water. The dispersion is filtered to remove any large lumps of resin and then coagulated by freezing or by the addition of an electrolyte, such as sodium chloride or aluminum sulfate solution. The precipitated polymer is washed with water to remove residual surface active agents and dried.

The process of this invention is generally applicable to any chlorine-containing vinyl polymer containing 14-75% chlorine and having the chlorine attached to the carbons of the polymer chain. For example, polymers obtained by the polymerization of vinyl chloride, with or without the addition of a monomer copolymerizable therewith, can be stabilized against the discoloration action of heat and light by means of the process of this invention.

The selection of the particular stabilizer combination to be used depends to a large extent on the final use to which these chlorine-containing vinyl resins are to be put. A combination of unsaturated phosphite and 1,2-epoxy compound or a combination of unsaturated phosphite and a salt of a fatty acid is particularly effective in resistance to discoloration on outdoor exposure and to fadeometer exposure. For outstanding resistance to discoloration on exposure to sunlight, it is preferred to use as the stabilizer combination, a mixture of unsaturated phosphite and phenoxypropylene oxide, or a mixture of unsaturated phosphite and magnesium stearate. The stabilizer comprising the combination of 3 parts of triallyl phosphite and 0.5 to 1 part of magnesium stearate has shown exceptional resistance to discoloration on outdoor exposure. In many cases with these compositions if a slight initial color forms during fabrication, it is bleached out on exposure to sunlight.

If compositions showing exceptional heat stability are desired, it is preferred to use as the stabilizing agent a combination of unsaturated phosphite, a 1,2-epoxy compound of relatively low volatility at ordinary temperatures, that is having a boiling point at atmospheric pressure of over 200° C., for example, beta- naphthoxypropylene oxide, and from 0.1 to 3% of an alkaline earth salt of a long chain fatty acid, for example, magnesium stearate. This composition is outstanding with respect to stability at elevated temperatures.

The invention is further illustrated by the following examples in which parts are given by weight, unless otherwise specified.

EXAMPLE I

A mixture comprising 100 parts of the copolymer obtained by polymerizing a mixture of vinyl chloride and diethyl fumarate in the ratio of 1 part of the latter to 19 of the former, 3 parts of triallyl phosphite, 2 parts of beta-naphthoxypropylene oxide, and 0.5 part of magnesium stearate is thoroughly homogenized by working on a roll mill heated to 145° C. for 5 minutes. The composition thus produced is removed in the form of a colorless film. Sheeting prepared by heating this film at 150° C. under pressure between polished chromium plated steel plates for 2 minutes is clear and colorless and shows only a slight discoloration after heating for 2 hours at 125° C. This film is outstanding in resistance to discoloration on exposure in the fadeometer as indicated by the fact that it remains colorless after 96 hours exposure.

A film prepared under similar conditions but without the added stabilizer combination discolors to a grey-green on heating for 2 hours at 125° C. and to black after only 48 hours exposure in the fadeometer. Films containing 1% of magnesium stearate as the only stabilizer discolor badly on heating and also turn black after 48 hours fadeometer exposure. A film of the same resin containing 2% beta-naphthoxypropylene oxide as the only added stabilizer shows some resistance to discoloration on heating but discolors to a very deep red after 96 hours fadeometer exposure. A film of the same resin containing 3 parts of triallyl phosphite as the only stabilizer speckles in 48 hours fadeometer exposure and turns black after 96 hours.

Example II

A mixture comprising 100 parts of the copolymer obtained by polymerizing a mixture of vinyl chloride and diethyl fumarate in the ratio of 1 part of the latter to 19 parts of the former, 3 parts of triallyl phosphite, and 1.5 parts of magnesium stearate is thoroughly homogenized by milling for one and a half minutes on rolls at 145° to 150° C. and the resulting sheeting press-polished by heating under pressure between polished chromium plates. The polished films of this composition remain perfectly colorless and do not embrittle after 9 months outdoor exposure.

Example III

A mixture comprising 100 parts of polyvinyl chloride, 3 parts of triallyl phosphite, 2 parts of beta-naphthoxypropylene oxide, and 0.5 part of magnesium stearate is homogenized by working on a roll mill heated to 150° to 154° C. for ten minutes. The product obtained is subdivided, dissolved in 60:40 methyl ethyl ketone:toluene and flowed on to a glass plate. After evaporation of the solvent there is obtained an essentially colorless film .003 inch thick. This film remained perfectly colorless after 124 hours exposure in a fadeometer.

ated polyethylene with no stabilizer present, was subjected to the same treatment as a control. Each composition was removed from the rolls in the form of a slab and a sample of this slab was molded into a disc at 150–160° C. and 2000 lbs./sq. in. for 10 minutes. As shown in the table, composition (B) containing magnesium stearate alone as the additive and composition (D) containing no added agent were dark brown, indicating decomposition, whereas compositions (A) and (C), and in particular composition (C), showed marked superiority in heat stability under these conditions.

Samples of compositions (A), (B), (C), and (D) were cut from each of the rolled slabs and subjected to a further heat stability test at 180° C. in an atmosphere of air for 2 hours. The air was swept over the samples in place of the more conventional nitrogen in order to provide more extreme conditions for testing the stability of the resin. At the end of 2 hours the amount of acid (mostly hydrogen chloride) liberated from the samples was measured by titration with standard alkali and expressed as milligrams of hydrogen chloride evolved per gram of resin. The results are included in the table.

*Table*

| Composition | Added Stabilizer | Parts Stabilizer per 100 Resin | Mg. HCl Liberated per g. Resin | Color of Milled Disc |
|---|---|---|---|---|
| A | beta-Naphthoxypropylene oxide | 2 | 3.3 | Yellow. |
| B | Magnesium stearate | 0.5 | 3.7 | Dk. Brown. |
| C | Triallyl phosphite, beta-Naphthoxypropylene oxide, Magnesium stearate | 2, 2, 0.5 | 2.7 | Very pale yellow. |
| D | No stabilizer | | 7.0 | Dk. brown. |

Example IV

Additional compositions prepared by milling a mixture of powdered vinyl chloride/diethyl fumarate (95/5) copolymer with selected combinations of stabilizer are set forth in the following table. Films made from these compositions were polished by hot pressing between chromium plates and subjected to the indicated tests. In the first column, there is given the stabilizers in parts by weight to 100 parts of the copolymer resin. The four additional columns give respectively the color of the polished film (a) after polishing, (b) after 2 hours at 125° C., (c) after 96 hours fadeometer exposure, and (d) after outdoor exposure of the stated number of months.

In addition to the copolymers of vinyl chloride with diethyl fumarate, copolymers of vinyl chloride with dimethyl, di-n-butyl, di-isobutyl, dicyclohexyl, dibenzyl, and di-(chloroethyl) fumarate or maleate, and copolymers of vinyl chloride with the di-esters of fumaric or maleic acid with methoxy-, ethoxy-, or butoxyethanol may be used for the preparation of the compositions of this invention. Copolymers containing from 80 to 97% vinyl chloride with from 20 to 3% of an ethylene dicarboxylic acid ester, particularly a di-ester of fumaric acid or a di-ester of maleic acid are preferred copolymers for use in this invention. There may also be employed copolymers of vinyl chloride with vinyl esters of organic acids, such

| Stabilizer Parts/100 of Resin | Color Polished Film | Color 2 hours 125° C. | Color 96 hours Fadeometer | Color Outdoor Exposure |
|---|---|---|---|---|
| No stabilizer | Grey | Grey-green | Black in 48 hours | Deep red in 2 months. |
| 3 Triallyl Phosphite, 1 Sodium Stearate | Very slight color | Quite Tan | Few red specks in 48 hours. Quite spotty red in 96 hrs. | Colorless after 4 months. |
| 3 Triallyl Phosphite, 2 Phenoxypropylene oxide | do | Very slight tan | Bleached, colorless after 196 hrs | Bleached, colorless after 4 months. |
| 2 Beta-naphthoxy-propylene oxide, 0.5 Sodium Stearate | Light greenish brown | Greenish Tan | Black and Brittle after 48 hours | Deep red in 4 months. |

Example V

One hundred parts of chlorinated polyethylene containing 27% chlorine by weight was thoroughly mixed on rolls heated at 150° C. for 3 minutes with various quantities of stabilizers as noted for (A), (B), and (C) in the table below. Composition (D), which consisted of the chlorinas vinyl acetate and vinyl propionate, containing 80 to 97% vinyl chloride, copolymers of vinyl chloride and vinylidene chloride, and copolymers of vinyl chloride with acrylates, such as methyl acrylate, ethyl acrylate and butyl acrylate, and also copolymers of vinyl chloride with methacrylates, such as methyl methacrylate, ethyl methacrylate, and butyl methacrylate, containing from 80 to 97% of vinyl chloride. In general, copolymers of vinyl chloride with one other ethylenically unsaturated compound, which contain 80-97% vinyl chloride can be stabilized in accordance with this invention.

The polymers and copolymers of vinyl chloride may be prepared by any of the processes well known in the art. Suitable methods include polymerization in aqueous emulsions, in solution, in ketonic solvents, in hydrocarbon nonsolvents for the resins, such as n-hexane, and also in the absence of solvents and nonsolvents.

A wide variety of catalysts may be used to accelerate the polymerization. Such catalysts as sodium, potassium or ammonium persulfate are preferred for preparing the resin by an aqueous emulsion process. Acyl peroxides, such as benzoyl peroxide, lauroyl peroxide, acetyl peroxide, and also hydrogen peroxide may be used. In the preparation of the resins by the polymerization of the monomer or monomers in aqueous emulsion, it is desirable to use surface-active agents, a procedure which is well known in the art.

Chlorinated polyethylenes having chlorine contents varying from about 14% to about 75% chlorine by weight may also be used for the preparation of the compositions of this invention. The chlorinated polyethylenes may be prepared by chlorinating polyethylenes of various molecular weights in solution or in aqueous suspension as described in U. S. P. 2,183,556 to Fawcett and in the patent application of Robert S. Taylor, Ser. No. 686,149, filed July 25, 1946.

The unsaturated phosphites are readily prepared from phosphorus trichloride and the desired unsaturated alcohol by carrying out the reaction in the presence of a hydrogen chloride acceptor, such as pyridine or dimethyl aniline, with ether or benzene as the reaction medium. A suitable process is described by Milobendzki and Sachnowski (Chem. Abs. 13, 2865 (1919)). Unsaturated alcohols that may be used for the preparation of the unsaturated phosphites having 3 to 14 carbons in each alkenyl group include among others allyl, methallyl, crotonyl, tiglyl and cinnamyl alcohols, hexadiene-2,4-ol-1, octatriene-2,4,6-ol-1, 3,7-dimethyl-octadiene-2,7-ol-1, 2-ethylhexene-2-ol-1, and 2-amylnonene-2-ol-1. Caution should be exercised in the preparation of these compounds since some of them tend to decompose vigorously at elevated temperatures. Those unsaturated phosphites derived from high boiling alcohols are preferably purified by a washing procedure.

Some of the 1,2-epoxy compounds suitable for the practice of this invention are common and easily obtainable, such as ethylene oxide and epichlorohydrin. Other types, such as the glycide ethers, are prepared by well known procedures given in the literature (Lindmann, Ber. 24, 2416 (1891), Boyd and Marle, J. Chem. Soc. 93, 840 (1909)). Examples of 1,2-epoxy compounds are phenoxypropylene oxide, phenoxybutylene oxide, alpha - naphthoxypropylene oxide, beta - naphthoxypropylene oxide, parachlorophenoxypropylene oxide, cresoxypropylene oxide, diglycide ethers, esters of epoxypropionic acid, and alkyl or aryl substituted ethylene oxides, such as ethylethylene oxide and benzylethylene oxide.

Combinations of chlorine-containing vinyl resins with a tri(2-alkenyl)phosphite and an alkali or alkaline earth metal salt of a fatty acid containing 10-18 carbon atoms; with a tri(2-alkenyl)phosphite and a 1,2-epoxy compound; and with a tri(2-alkenyl)phosphite, 1,2-epoxy compound, and an alkali or alkaline earth metal salt of a fatty acid containing 10-18 carbon atoms, can be prepared by any method of mixing desired. For example, a vinyl chloride polymer can be dissolved in a suitable solvent, such as cyclohexanone, methyl ethyl ketone-xylene, methyl isobutyl ketone-xylene, acetone-toluene, acetone, and tetrohydrofurane, and the stabilizer combination added to this solution.

Such solutions either with or without the addition of plasticizer, pigment, dyes and fillers can be used for the production of various articles, spinning of fibers, film casting or fabric coating. These stabilizers can also be incorporated into the resin alone, or in conjunction with fillers, plasticizers, pigments and the like, with the aid of a solvent in a Banbury mixer and the resultant product can be used for coating fabrics by a calendering procedure. The stabilized products of this invention may also be dissolved in a volatile solvent and used as a lacquer.

The compositions of this invention can be used for the preparation of molding powders, coatings for metals and fabrics, films and foils. If desired, the chlorine-containing vinyl resin composition stabilized according to the process of this invention may be combined with or prepared in the presence of plasticizers, dye softeners or other synthetic resins.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a chlorine-containing vinyl resin of 14 to 75% by weight chlorine in which the chlorine is attached directly to the carbon atoms in the polymer chain, from 1 to 6% by weight, based on said resin, of a tri-2-alkenyl)phosphite having 3 to 14 carbons in each alkenyl group, and from 0.1 to 5.0% by weight based on said resin, of a 1,2-epoxy compound having a boiling point above 200° C.

2. A composition of matter comprising a chlorine-containing vinyl resin of 14 to 75% by weight chlorine in which the chlorine it attached directly to the carbon atoms in the polymer chain, from 1 to 6% by weight, based on said resin, of a tri-(2-alkenyl)phosphite in which each alkenyl group contains 3 to 4 carbon atoms and has a terminal $CH_2=C$ group, and from 0.1 to 5.0% by weight, based on said resin, of a 1,2-epoxy compound having a boiling point above 200° C.

3. A composition of matter comprising a chlorine-containing vinyl resin of 14 to 75% by weight chlorine in which the chlorine is attached directly to the carbon atoms in the polymer chain, from 1 to 6% by weight, based on said resin, of triallyl phosphite, and from 0.1 to 5.0% by weight, based on said resin, of a 1,2-epoxy compound having a boiling point above 200° C.

4. A composition of matter comprising a chlorine-containing vinyl resin of 14 to 75% by weight chlorine in which the chlorine is attached directly to the carbon atoms in the polymer chain, from 1 to 6% by weight, based on said resin, of triallyl phosphite, and from 0.1 to 5.0% by weight, based on said resin, of phenoxy-propylene oxide.

5. A composition of matter comprising a chlorine-containing vinyl resin of 14 to 75% by weight chlorine in which the chlorine is attached directly to the carbon atoms in the polymer chain, from 1 to 6% by weight, based on said resin, of a tri-(2-alkenyl)phosphite having 3 to 14 carbons in each alkenyl group, from 0.1 to 5.0% by weight, based on said resin, of a 1,2-epoxy compound having a boiling point above 200° C. and from 0.1 to 3.0% by weight, based on said resin, of a fatty acid salt selected from the class consisting of alkali and alkaline earth metal salts of fatty acids containing from 10 to 18 carbon atoms.

6. A composition of matter as set forth in claim 5 in which said tri-(2-alkenyl)phosphite is triallyl phosphite.

7. A composition of matter comprising a chlorine-containing vinyl resin of 14 to 75% by weight chlorine in which the chlorine is attached directly to the carbon atoms in the polymer chain, from 1 to 6% by weight, of triallyl phosphite, from 0.1 to 5.0% by weight, based on said resin, of beta-naphthoxypropylene oxide and from 0.1 to 3.0% by weight, based on said resin, of magnesium stearate.

8. A composition of matter comprising a chlorine-containing vinyl resin, from 1 to 6% by weight, based on said resin, of a tri-(2-alkenyl)-phosphite having 3 to 14 carbons in each alkenyl group, and from 0.1 to 5.0% by weight, based on said resin, of a 1,2-epoxy compound having a boiling point above 200° C., said chlorine-containing vinyl resin consisting of a copolymer of 80 to 97% vinyl chloride and 20 to 3% of an ethylene dicarboxylic acid ester.

9. A composition of matter as set forth in claim 8 in which said tri-(2-alkenyl)phosphite is triallyl phosphite.

10. A composition of matter comprising a chlorine-containing vinyl resin, from 1 to 6% by weight, based on said resin, of a tri-(2-alkenyl)-phosphite having 3 to 14 carbons in each alkenyl group, from 0.1 to 5.0% by weight, based on said resin, of a 1,2-epoxy compound having a boiling point above 200° C., and from 0.1 to 3.0% by weight, based on said resin, of a fatty acid salt selected from the class consisting of alkali and alkaline earth metal salts of fatty acids containing from 10 to 18 carbon atoms, said chlorine-containing vinyl resin consisting of a copolymer of 80 to 97% vinyl chloride and 20 to 3% of an ethylene dicarboxylic acid ester.

11. A composition of matter as set forth in claim 10 in which said tri-(2-alkenyl)phosphite is triallyl phosphite.

HENRY J. RICHTER.

No references cited.